United States Patent [19]

Berger et al.

[11] 4,366,720
[45] Jan. 4, 1983

[54] APPARATUS FOR MEASURING STRESS DISTRIBUTION ACROSS THE WIDTH OF FLEXIBLE STRIP

[75] Inventors: Bernd Berger, Kaarst; Gert Mücke, Hilden; Helmut Thies, Kaarst; Eberhard Neuschütz, Ratingen, all of Fed. Rep. of Germany

[73] Assignee: Betriebsforschungsinstitut VDEh Institut fur angewandte Forschung GmbH, Dusseldorf, Fed. Rep. of Germany

[21] Appl. No.: 204,250

[22] Filed: Nov. 5, 1980

[30] Foreign Application Priority Data

Nov. 6, 1979 [DE] Fed. Rep. of Germany ....... 2944723

[51] Int. Cl.³ .............................................. G01L 5/04
[52] U.S. Cl. .......................................... 73/862.07
[58] Field of Search ................ 73/862.07, 862.48, 767, 73/774, 105

[56] References Cited

U.S. PATENT DOCUMENTS 2,809,519 10/1957 Kaestner ......................... 73/862.48
4,127,027 11/1978 Berger et al. ................... 73/862.07

*Primary Examiner*—Anthony V. Ciarlante
*Attorney, Agent, or Firm*—Holman & Stern

[57] ABSTRACT

A device for measuring stress distribution across the width of flexible longitudinally moving strip material, such as strip steel during coldrolling. The device includes a deflection measuring roller comprised of a plurality of rotatable sections mounted side-by-side. Some of the sections have force pick-ups fitted therein and the elements cooperatively function to detect and measure deflection as an indication of stress distribution across the strip.

11 Claims, 5 Drawing Figures

APPARATUS FOR MEASURING STRESS DISTRIBUTION ACROSS THE WIDTH OF FLEXIBLE STRIP

BRIEF SUMMARY OF THE INVENTION

This invention relates to a device for measuring stress distribution across the width of flexible, longitudinally advancing strip.

A device of this kind is described in German OS No. 26 30410.9. In the present arrangement, by successive sequential scanning of force-pick-up devices a measurement is obtained which is free from mutual interference of the pick-ups. Added to this, there is the advantage that the individual sections of the roller consist of rings which have great form-retaining rigidity without creating an excessively high inertia moment for the deflection-measuring roller as a whole, so that it is not necessary to provide a separate drive for the roller thus avoiding the speed adjustment problems which would be entailed by such a drive.

Whilst with a deflection measuring roller of this kind the force is always measured at a single point only, it nevertheless acts effectively, albeit in different strengths across the whole width of the roller. This creates a bending load to which the roller responds by its elastic behaviour. Admittedly, the elastic deformation is very slight but still capable of falsifying the individual pick-up data. For, in the presence of a bending load, the circular cross section of the roller tends towards a deformation into an elliptical cross section with the smaller axis extending in the direction of the applied bending force. The peripheral zones of the individual sections are elongated at right angles to the direction of the bending force and thus apply such a load to the force-pick-ups that deflection forces are simulated which do not actually exist. For instance, it may happen that a bending force is actually being measured in the absence of a deflection force at a given point across the width of the roller due to a deflection of the roller, i.e. deformation of its cross section.

It is the aim of the present invention to design the deflection-measuring roller in such a way that the measured data cannot be falsified due to the application of loads which in conventional deflection-measuring rollers cause the latter to bend or flax. It is not the aim of this invention to compensate electric distortion or data falsification but rather to prevent such data falsification from the outset.

This aim is achieved by providing that each roller section comprises two parts, one of which has an annular intermediate zone located between radially inner and outer zones of the other part, the parts being urged into abutment to support the roller as a whole against bending. With the individual sections of the deflection-measuring roller arranged in this special manner it is possible to a large extent to achieve a functional separation of those regions in the section which are used for the measuring operations from those which simply have a supporting function. Besides the advantage of enabling optimum constructional adaptation of these regions to their respectively assigned functions this arrangement allows the measuring of deflection forces virtually irrespectively of any potentially occurring roller deflection or deformation, because the peripheral zones of the roller sections are totally unaffected by flexure of the roller as a whole. The relative sizes of the abutment surfaces as described hereafter make an essential contribution to the desired aim of giving full consideration to conditions under load application and providing load relief for those regions which are specifically assigned to the measuring function.

Clearance penetration of the individual sections by tie bolts whereby they are held together, also contributes to the desired result that no forces should be transmitted directly by said bolts to the sections.

The two regions of any one roller section may be physically separate rings or they may in each case be integrated in a single disc. In addition to its special advantages from a constructional point of view, the last mentioned embodiment also offers the facility of transferring any deformations in the peripheral zone which may occur into those peripheral regions which do not influence the pick-up devices. The pick-ups are here practically arranged in solid blocks which, in contrast with the remainder of the peripheral zone, are not capable of differential elastic deformation under pressure. A sector which carries the pick-up may be axially spaced away from all surrounding regions and also, by virtue of the provision of radial incisions, completely relieved of all influences from the rest of the peripheral zone in the same sector. A surrounding envelope or jacket may consist, for example, of a plastics material which is sufficiently resilient to preclude the transmission of forces.

BRIEF DESCRIPTION OF THE DRAWINGS

The invention is more specifically described with reference to various embodiments thereof illustrated by way of example in the accompanying drawings wherein, each FIGURE being a schematic representation.

DETAILED DESCRIPTION

Figure 1:
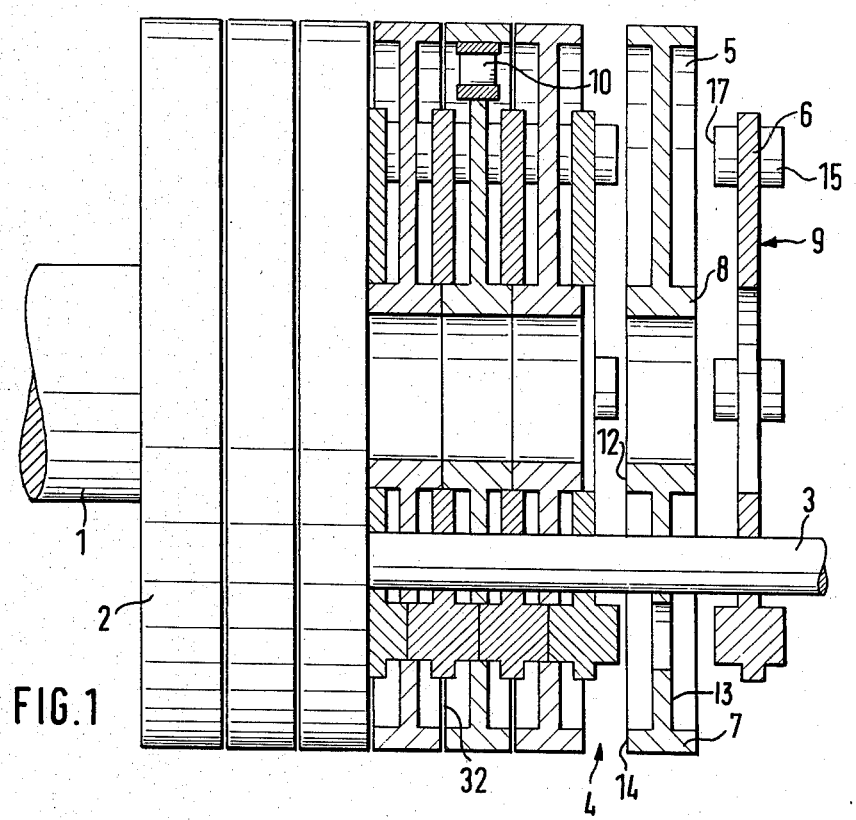
FIG. 1 is a partial longitudinal section through the new deflection-measuring roller with individually shown rings.

FIG. 1 shows the left hand side portion or section of a first embodiment of the invention. The drawing clearly shows the bearing pin 1 which is connected to the end plate 2. The latter is tightened relative to the other end plate on the opposite side of the roller by means of the tie-bolts 3 which can also be seen in FIG. 2.

The individual sections 4 of the roller are arranged between the two end plates, a plurality, or all, of the sections 4 being provided with force pick-ups 10 as described hereafter. It will be seen that in each section two parts are formed by rings 5, 6. The rings 5 have peripheral zones 7 as well as radially inner central zones 8 between which extend the intermediate zones 9 formed by rings 6.

Figure 2:
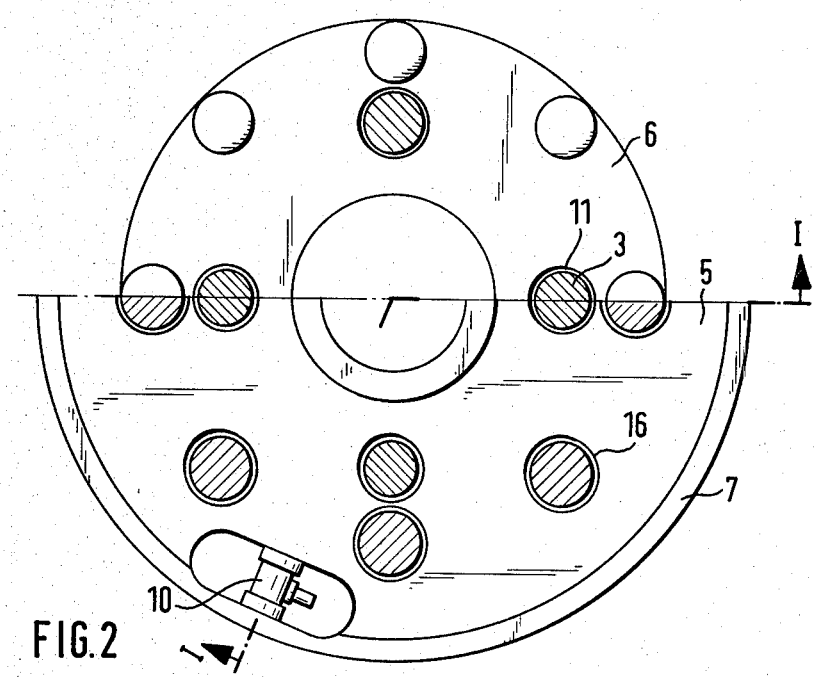
FIG. 2 is a cross section through the roller according to FIG. 1.

The two rings 5 and 6 and their relative position will also be clearly observed from FIG. 2 which is a half-cross section looking at ring 5 and a half-cross section looking at ring 6. The force-pick-up 10 will be seen in the peripheral zone 7 of ring 5. FIG. 2 also shows that the tie-bolts 3 pass through rings 5 as well as through rings 6 in bores 11 which have a larger diameter than that of the tie-bolts 3 so that there is no physical contact between the bolts and the rings.

The angular section line I—I in FIG. 2 relates to FIG. 1 enabling, the pick-up device 10 of FIG. 1 to be depicted as well as a bolt 3. FIG. 1 further shows that the abutment 12 of the central zones 8 are closely adjacent whilst the disc surfaces 13 are relatively spaced apart by considerable distances. Lastly it will also be seen that the end faces 14 of the peripheral zones 7 have a small amount of clearance relative to the corresponding surfaces of the adjacent rings. Altogether, therefore, within the roller only the central zones 8 of the rings 5 have a dynamic connection, whilst the remaining parts of rings 5 are absolutely contact-free.

However, the dynamic connection of the rings 5 is not strong enough to provide effective support capable of opposing bending deformation. For this reason the additional rings 6 are provided which have a larger inside diameter than the central zones 8 of the other rings 5 and which are centered on these central zones 8. Near their periphery these rings 6 comprise cylindrical lugs 15 and the rings 5 are provided with corresponding bores 16 of slightly larger diameter through wihch the lugs 15 extend without making physical contact therewith in such a way that the abutment 17 of adjacent rings 6 are in line and touch one another. Since, moreover, the abutment surfaces 17 are substantially larger than abutment surfaces 12, they transmit correspondingly higher application forces so that in the sections of the new deflection-measuring roller according to this invention the supporting function, on the one hand, and the measuring function on the other, are virtually completely separated and cannot influence one another.

Figure 3:
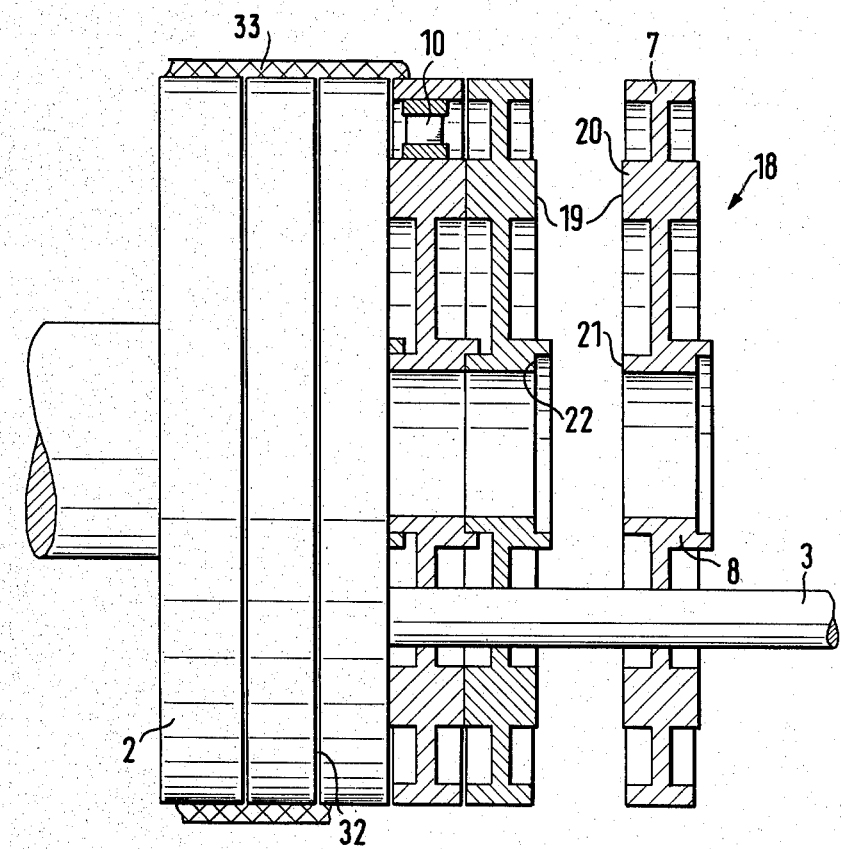
FIG. 3 is a partial longitudinal section through another embodiment.

As shown in FIG. 3, the two functionally different parts in each section of the new deflection-measuring roller may also be integrated in the form of a single disc 18 in which event, however, a shorter region of contactless support is provided in the radial direction for the pick-up devices 10 because the abutment surfaces 19 of disc 18 are formed by concentric elevations, or bosses 20 in the middle between the peripheral zone 7 and the central zone 8 of each disc 18. Here again the rule applies that the area of abutment surfaces 19 is substantially greater than that of abutment surfaces 21, 22 associated with the central zones 8. Moreover, the last mentioned surfaces 21, 22 are bounded by axial projections in such a way as to provide a mutual centering effect for automatic concentric alignment of the discs 18. In respect of the other constructional features concerning the tie-bolts 3 and the end plates 2, this embodiment is identical with that shown in FIG. 1.

Figure 4:
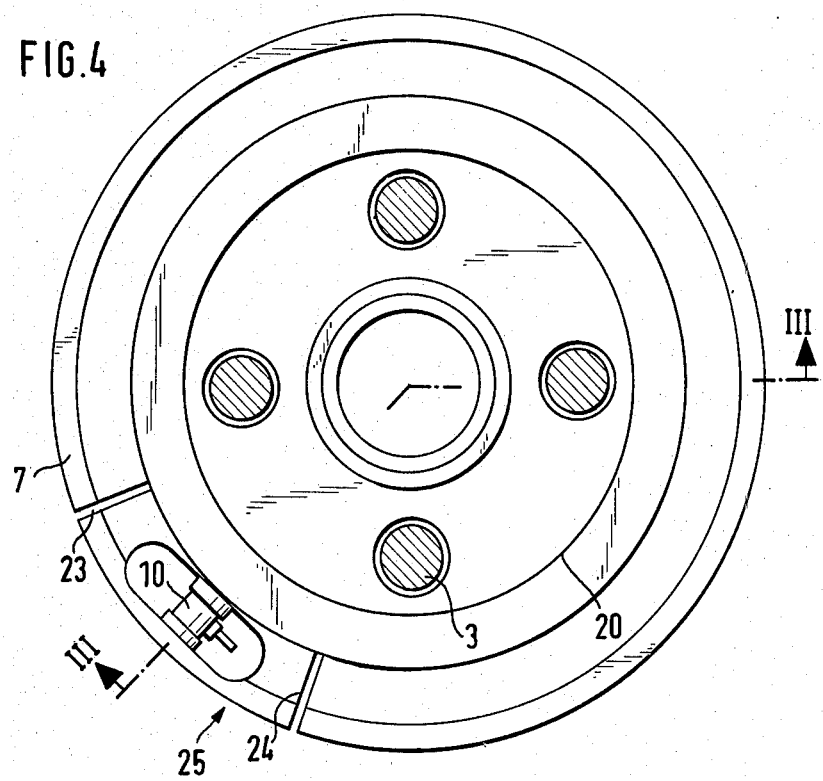
FIG. 4 is a cross section through the embodiment according to FIG. 3.
Figure 5:
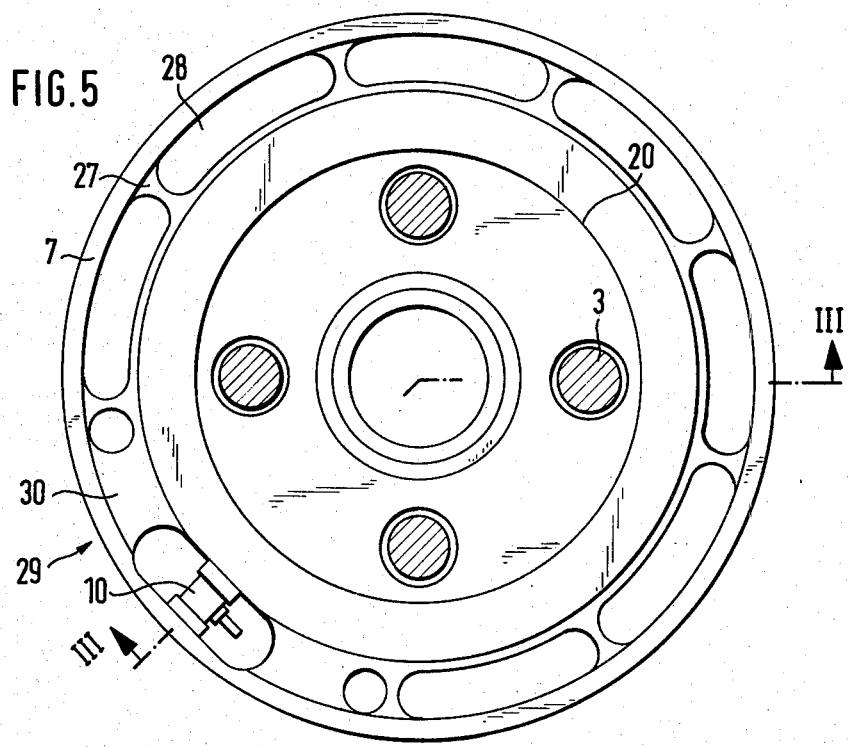
FIG. 5 is a cross section through another deflection measuring roller having a longitudinal section as in FIG. 3.

The discs 18 may be of various constructional design, as will be seen from FIG. 4 on the one hand, and FIG. 5 on the other. Both FIGURES show section lines III-III which refer to the cross section shown in FIG. 3. The design of the discs is particularly conceived in view of the fact that the contact-less support in the radial direction for the pick-up devices 10 extends only up to the, preferably annular, elevations or bosses 20.

In order to eliminate the transmission of flexion, the design shown in FIG. 4 provides additional isolation in the peripheral direction for the sector which carries the pick-up device 10. This is achieved by means of radial cuts or incisions 23, 24 in the peripheral zone 7 so that the sector 25 on which the pick-up device 10 is mounted is effectively isolated from the rest of the peripheral zone 7. Thus, in the event of roller flexion the deformation in the remainder of the peripheral zone 7 cannot affect sector 25. In other words, the slightly greater risk of such bending deformation adversely affecting the signals of the pick-up devices 10 is compensated by this further developed constructional design of sector 25.

FIG. 5 shows a slightly different method, the peripheral zone 7 here being connected to the intermediate zone through narrow web sections 27 only, which are left standing between milled cut-outs 28. By contrast, the sector 20 on which the pick-up 10 is mounted has an inherently compression-rigid solid-mass-connection 30 to the intermediate zone.

It will thus be appreciated that in both arrangements shown in FIGS. 4 and 5 the sectors, respectively numbered 25 and 29, can yield only as a block in the event of bending deformation of the roller, said block remaining comparatively free of such deformations. On the other hand, particularly in the arrangement according to FIG. 5, the rest of the peripheral zone 7 is perfectly capable of elastic deformation under roller flexion so that the radial distance between peripheral zone 7 and the intermediate zone may vary.

The earlier mentioned radial distances between the peripheral zones are shown on a slightly enlarged scale in FIGS. 1 and 3 for easier identification and marked by reference number 32. Advantageously they amount to approximately 0.1mm in unstressed condition and slightly less when the roller is in tension. The gaps need not necessarily remain perfectly open but may be filled in with a material provided that this does not admit any transmission of forces in the axial direction. For instance, a plastics material is very suitable at these points as well as for an outer envelope or jacket 33 around the measuring roller as a while as hereinbefore proposed.

We claim:

1. A device for measuring stress distribution across the width of a flexible, longitudinally advancing strip, particularly as applied to strip steel during cold rolling thereof, said device comprising a deflection measuring roller which consists of a plurality of rotatable sections mounted laterally side-by-side to engage the strip, each said section comprising two parts, one of said parts having an annular intermediate zone which is located between annular peripheral and radially inner zones on the other part, all of said annular zones being mutually concentric, force pick-up devices located in the peripheral zones of a plurality of said other parts, and there is provided a clearance separating each said peripheral zone from a corresponding zone of an adjacent section, said radially inner zones and said intermediate zones having abutment surfaces in engagement with corresponding zones of an adjacent section.

2. A device as claimed in claim 1, wherein the abutment surfaces of said intermediate zones are substantially larger than the abutment surfaces of said radially inner zones.

3. A device according to claim 1, which includes tie-bolts which urge the respective abutment surfaces of said intermediate and radially inner zones into contact, said intermediate and radially inner zones being provided with in-line bores of larger diameter than the diameters of the tie-bolts, whereby the tie-bolts extend through these zones without making physical contact therewith.

4. A device according to claim 1 wherein the two parts are physically separate first and second rings.

5. A device according to claim 4 wherein the abutment surfaces of first rings which form the intermediate zones are formed on axially-extending cylindrical lugs which are angularly spaced on a pitch concentric with the ring axis, said lugs extending without physical contact through bores of larger diameter formed in said other rings between their peripheral and radially inner zones.

6. A device according to claim 5, wherein the first rings which form the intermediate zones have a larger inside diameter than the radially inner zones of the second rings and are centered on said radially inner zones.

7. A device according to claim 1 wherein the two parts are integrated in a single disc, wherein the abutment surfaces of the intermediate zone are raised concentric bosses and that the radially inner zones are provided with mutually centering means.

8. A device according to claim 7 wherein a sector of the peripheral zone which supports said pick-up has a compression-rigid solid connection to said intermediate zone.

9. A device according to claim 8 wherein said sector which supports said pick-up device is separated in the peripheral zone from the rest of the peripheral zone by means of radial gaps.

10. A device according to claim 8 wherein the peripheral zones of adjacent sectors have an axial clearance of approximately 0.1mm in an unstressed condition of the deflection measuring roller.

11. A device according to claim 1 wherein the outer surface of the deflection measuring roller is provided with a jacket.

* * * * *